US009363545B2

(12) United States Patent
Williams et al.

(10) Patent No.: US 9,363,545 B2
(45) Date of Patent: Jun. 7, 2016

(54) APPARATUS AND METHOD FOR TELEVISION

(71) Applicants: SONY CORPORATION, Tokyo (JP); SONY EUROPE LIMITED, Surrey (GB)

(72) Inventors: David Rowland Williams, Cardiff (GB); Nigel Stuart Moore, Berkshire (GB); Brian Edwards, Bridgend (GB)

(73) Assignees: SONY CORPORATION, Tokyo (JP); SONY EUROPE LIMITED, Surrey (GB)

( * ) Notice: Subject to any disclaimer, the term of this patent is extended or adjusted under 35 U.S.C. 154(b) by 0 days.

(21) Appl. No.: 14/429,580

(22) PCT Filed: Sep. 11, 2013

(86) PCT No.: PCT/GB2013/052370
§ 371 (c)(1),
(2) Date: Mar. 19, 2015

(87) PCT Pub. No.: WO2014/083303
PCT Pub. Date: Jun. 5, 2014

(65) Prior Publication Data
US 2015/0229981 A1    Aug. 13, 2015

(30) Foreign Application Priority Data

Nov. 30, 2012  (GB) .................................. 1221646.1

(51) Int. Cl.
*G06F 3/00* (2006.01)
*G06F 13/00* (2006.01)
(Continued)

(52) U.S. Cl.
CPC ......... *H04N 21/26283* (2013.01); *H04N 7/162* (2013.01); *H04N 21/25891* (2013.01);
(Continued)

(58) Field of Classification Search
CPC ............ H04N 5/44543; H04N 21/482; H04N 21/47214; H04N 21/84; H04N 21/4532; H04N 5/782
USPC ..................................... 725/38–40, 46, 54, 58
See application file for complete search history.

(56) References Cited

U.S. PATENT DOCUMENTS

2003/0177495 A1*  9/2003  Needham et al. ................ 725/55
2004/0183947 A1*  9/2004  Lee ............................... 348/570
(Continued)

FOREIGN PATENT DOCUMENTS

EP            2252051 A1   11/2010

OTHER PUBLICATIONS

International Search Report issued Dec. 5, 2013 in PCT/GB2013/052370 filed Sep. 11, 2013.

*Primary Examiner* — Oleg Asanbayev
(74) *Attorney, Agent, or Firm* — Oblon, McClelland, Maier & Neustadt, L.L.P.

(57) ABSTRACT

An apparatus for selecting television programs for display on a display device, for example a television, includes a receiver receiving audio/video data representing the television programs and receiving data indicating a schedule for the television programs. A control process receives an indication for at least one of the television programs to be broadcast providing a status of an availability for streaming the television program after the television program has been broadcast, and in response to the indication of the status of the availability for streaming the television program to perform a predetermined action in accordance with predetermined conditions. The predetermined actions may include, for example, recording the television program or generating a prompt for the user to watch the broadcast television program in response to an indication by the availability status that the television program will not be made available for streaming after being broadcast.

11 Claims, 4 Drawing Sheets

(51) Int. Cl.
*H04N 5/445* (2011.01)
*H04N 21/262* (2011.01)
*H04N 21/258* (2011.01)
*H04N 21/2665* (2011.01)
*H04N 21/433* (2011.01)
*H04N 21/462* (2011.01)
*H04N 21/482* (2011.01)
*H04N 21/6543* (2011.01)
*H04N 21/858* (2011.01)
*H04N 7/16* (2011.01)
*H04N 21/472* (2011.01)

(52) U.S. Cl.
CPC ....... *H04N21/2665* (2013.01); *H04N 21/4334* (2013.01); *H04N 21/4622* (2013.01); *H04N 21/47211* (2013.01); *H04N 21/482* (2013.01); *H04N 21/6543* (2013.01); *H04N 21/8586* (2013.01)

(56) References Cited

U.S. PATENT DOCUMENTS

| | | |
|---|---|---|
| 2005/0204386 A1* | 9/2005 | Ismail et al. .................... 725/46 |
| 2006/0272028 A1 | 11/2006 | Maes |
| 2007/0168539 A1 | 7/2007 | Day |
| 2007/0250875 A1* | 10/2007 | Weaver ........................... 725/89 |
| 2009/0172552 A1 | 7/2009 | Segel |
| 2009/0249400 A1 | 10/2009 | Carlberg et al. |
| 2010/0260475 A1 | 10/2010 | Moore et al. |
| 2010/0262997 A1 | 10/2010 | Dove |
| 2014/0130097 A1 | 5/2014 | Londero |

* cited by examiner

APPARATUS AND METHOD FOR TELEVISION

FIELD OF DISCLOSURE

The present disclosure relates to apparatus and methods for use with a television for selecting programmes for display on the television. Accordingly, embodiments can provide apparatus and methods for generating and displaying an electronic programme guide (EPG) on a display device such as a television.

BACKGROUND OF THE DISCLOSURE

A continuing development in television systems and technologies and a cross over with other forms of delivering television programmes has meant an increasing level of complexity and development of television receivers and apparatus for receiving and displaying audio/video data representing television programmes. Modern televisions are typically provided with an interface for displaying television programmes which are available for a user to select from various television channels which the television can receive with respect to time. Such an interface is typically referred to as an Electronic Programme Guide (EPG). Accordingly a user can browse through an EPG to view available programmes and using for example a remote control can select a desired programme for display on the television. An apparatus for receiving data representing a schedule of television programmes for generating the EPG may therefore exist within the television itself, or may exist within a set top box. The television or the set top box may be connected to a source for receiving the television signals such as a television antenna for detecting terrestrial signals carrying the television programmes, for example with DVB-T or DVB-T2 or a cable connection for receiving television programmes from DVB-C or DVB-C2 or a satellite dish for DVB-S or DVB-S2. Alternatively, television programmes can be delivered by mobile network broadcasts or via an internet such as for example internet protocol (IP) television.

In European Patent Application EP2252051A1 there is disclosed a method of content retrieval using an electronic programme guide (EPG) by selecting a content item out of a set of contents items and using the item as a seed to execute a recursive or iterative process until one of the content items of the set is determined by the user as a content item for consuming. The content item is displayed with respect to a sub set of the seed items at a display in connection with a television apparatus and each of the content items of the respective sub set is represented by a respective image so that a user may select a content item from the sub set for display.

US Patent Application US2010/0260475 discloses a television recording apparatus which includes a recording unit for recording television signals and stores meta data representing information in respect of the recording including a channel and the recording time. The graphical display of the recordings is displayed in accordance with a schedule of recordings in which graphical objects representing the respective recordings are arranged in two dimensions. An EPG is therefore produced with a format corresponding to the recorded items and programmes can be filtered to display programmes at certain times in the EPG.

US Patent Application 2007/0168539 discloses a television recording and processing apparatus which is arranged to generate an EPG of television programmes which are to be broadcast on a plurality of broadcast channels. The apparatus is further configured to monitor a status of availability of a multi-media asset which is available from a delivery system such as streaming from a server. If the status of availability of the multi-media asset should change, because the multi-media asset will become unavailable then the apparatus responds to the change of status by accessing the multimedia asset and recording the multimedia asset locally on the recording apparatus.

The development of the internet for accessing television content has meant that in recent years even if a television programme has already been transmitted on a broadcast channel, a user can select the television programme for display by accessing a server which can stream the television programme in the form of audio/video data transported in data packets using an internet protocol from the server. A receiver of the data packets can recover the audio/video data and regenerate the television programmes for display on a television. Thus, as well as conventional broadcast channels which broadcast television programmes at particular times, a user can have the option of selecting a television programme which has been broadcast by accessing a server via the internet to receive that television programme. Accordingly there have been developed EPGs which include an indication that a television programme which has already been broadcast may still be accessed by streaming the television programme via the internet. Such an EPG may be referred to as a "reverse" EPG because the user can scroll backwards in time to review times or days which are backwards in time which display a schedule of television programmes which have been broadcast but include an indication that these can be accessed by streaming over the internet. By displaying such an indication the user can select a television programme from a set top box which may include an arrangement for automatically accessing the television programme from a server so as to stream the audio/video data to the television or set top box for display.

Providing a more convenient way of delivering television content to a user which utilises an EPG and which improves a user experience continues to be desirable.

SUMMARY OF DISCLOSURE

According to one aspect of the present disclosure there is provided an apparatus for selecting television programmes for display on a display device such as a television, personal computer, mobile device or tablet computer, the apparatus comprising a receiver for receiving audio/video data representing the television programmes and for receiving data indicating a schedule for the television programmes, the schedule of television programmes including television programmes which are to be broadcast by one or more broadcast transmission systems for each of the plurality of television channels with the respect to a transmission time. Furthermore the television schedule also includes television programmes which have been transmitted by the one or more broadcast transmission systems and for one or more of the television programmes in the television schedule, which have been transmitted, an indication that the television programme can be received by selectively streaming audio/video data representing the television programme from one or more servers. For example, the one or more broadcast transmission systems may comprise a terrestrial or satellite broadcast service or indeed a cable service transmitting television programmes in accordance with a DVB standard such as DVB-T, T2, C, C2 or S2, or delivered by mobile cellular networks using broadcast channels or internet protocol television. A control processor is configured to receive the data indicating the schedule of television programmes and to generate signals representing the schedule of television programmes for display on the television, so that a user may select the television programmes for display on the display device or for recording. Thus, the generated signals can form an Electronic Programme Guide (EPG) when displayed to the user on a display device thereby forming an interface through which the user can select appropriate television programmes. The control processor is configured to receive an indication for at least one of the television programmes which are to be broadcast providing a status of an availability for streaming the television programme after the television programme has been broadcast or whilst the television programme is being broadcast, and in response to the indication of the status of the availability for streaming the television programme to perform a predetermined action in accordance with predetermined conditions. The predetermined actions may include for example, recording the television programme or generating a prompt for the user to watch the broadcast television programme in response to an indication by the availability status that the television programme will not be made available for streaming after being broadcast.

Embodiments of the present disclosure provide an arrangement in which an apparatus for presenting television programmes on a television includes generating an EPG in which a schedule of television programmes for one or more channels is presented to a viewer. According to the present technique the apparatus receives a signal from a source, such as a server or within broadcast audio/video signals representing the television programmes, indicating, for one or more of the television programmes which are to be broadcast, a status of an availability for selectively streaming the one or more television programmes after the television programmes have been broadcast. In response to the indication of the status of availability for selectively streaming the television programmes after they have been broadcast, the apparatus can perform different actions in dependence upon predetermined logic. In one example the EPG is enhanced to provide an indication that the television programme will not be available for selectively streaming after it has been broadcast but in another example the apparatus is arranged to generate signals on the EPG prompting the user to either watch the television programme when it is broadcast or to record the television programme when it is broadcast for later viewing by the user. The selection of the action taken may be preprogrammed by a user or may be automatically determined in accordance with a user profile or preferences generated from recording or watching preferences of television programmes which have been recorded or watched by the user in combination with preprogramming indications provided by the user. Embodiments of the present technique also help to determine the availability of content for a so called "Restart" functionality, where a user can rewind, pause or start the content from the beginning. The restart functionality might be operated using Video on Demand catch-up files being accessed while the broadcast content is being played, or restart could be operated by accessing a networked cache window of a live IP simulcast, where the window is a sliding segment of content that corresponds and moves alongside the broadcast. This restart functionality is useful when a user has missed the beginning of a program. A status availability of a television programme may therefore also include an indication that content is not available for either restart or video on demand during or after broadcast.

In some embodiments the signals indicating availability of the television programme after it has been broadcast include an indication as to an extent to which the signals can be relied upon. If the status of availability is indicated as being unreliable then the apparatus for displaying the television programmes may not automatically record the television programme, even if this meets the user preconditions or not automatically recording without further reference to user input independence upon the predetermined conditions.

Various aspects and features of the present disclosure are defined in the appended claims which include a graphic user interface, a set top box, a television and a transmitter and a method of receiving and a method of transmitting.

BRIEF DESCRIPTION OF DRAWINGS

Embodiments of the present disclosure will now be described by way of example only with reference to the accompanying drawings, wherein like parts are provided with corresponding reference numerals, and in which.

DESCRIPTION OF PREFERRED EMBODIMENTS

Figure 1:
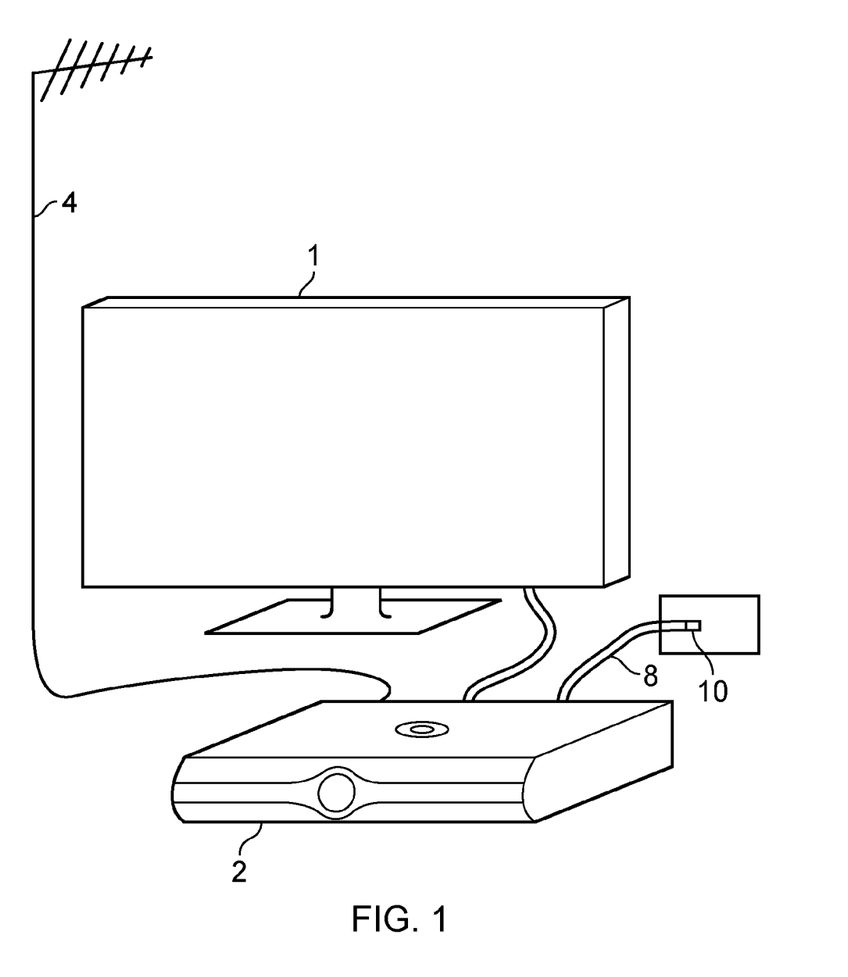
FIG. 1 is a pictorial representation of a television connected to a set top box in domestic environment.

Embodiments of the present disclosure may find application in various forms in which an electronic programme guide (EPG) is presented on a television for a user to select television programmes for display. An example arrangement is shown in FIG. 1. In FIG. 1 a television apparatus 1 is shown in association with a set top box 2. As shown in FIG. 1 the set top box 2 receives signals from a television antenna 4. The set top box is connected to the television 1 by a connection cable 6. The set top box 2 is also connected via cable 8 to a wired internet connection 10.

Figure 2:
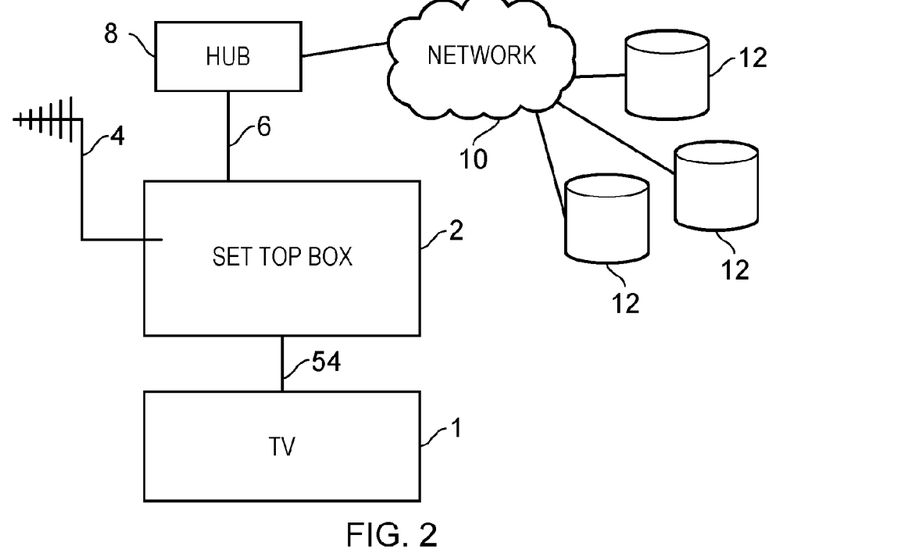
FIG. 2 is schematic block diagram of a set top box and a television connected to a terrestrial television receiver and to an internet.

A schematic block diagram illustrating the arrangement shown in FIG. 1 in functional form is shown in FIG. 2. In FIG. 2 the television 1 is connected to the set top box 2 and the set top box 2 is connected to the internet via cable 6 which connects the set top box to a home hub or gateway 8 which is connected to an internet represented as a cloud 10 which is provided by an internet service provider. The television antenna 4 is also connected to the set top box 2.

As shown in FIG. 2 the set top box 2 has access via the home gateway hub 8 and internet 10 to servers 12. The servers 12 can form a source of data from which a television programme schedule can be created. Furthermore one or more of the servers 12 can provide a source for audio/video data representing the television programme for streaming the television programme over the internet through the network 10 the home gateway 8 into the set top box 2. Therefore, the servers 12 can form both a source of the television programme schedule for generating an EPG as well as a source of the television programmes themselves particularly for example where the television programmes are to be streamed after the television programmes has been broadcast from a broadcasting system. In an alternative arrangement the antenna and hub may be connected directly to the TV without the need for a set top box.

Figure 3:
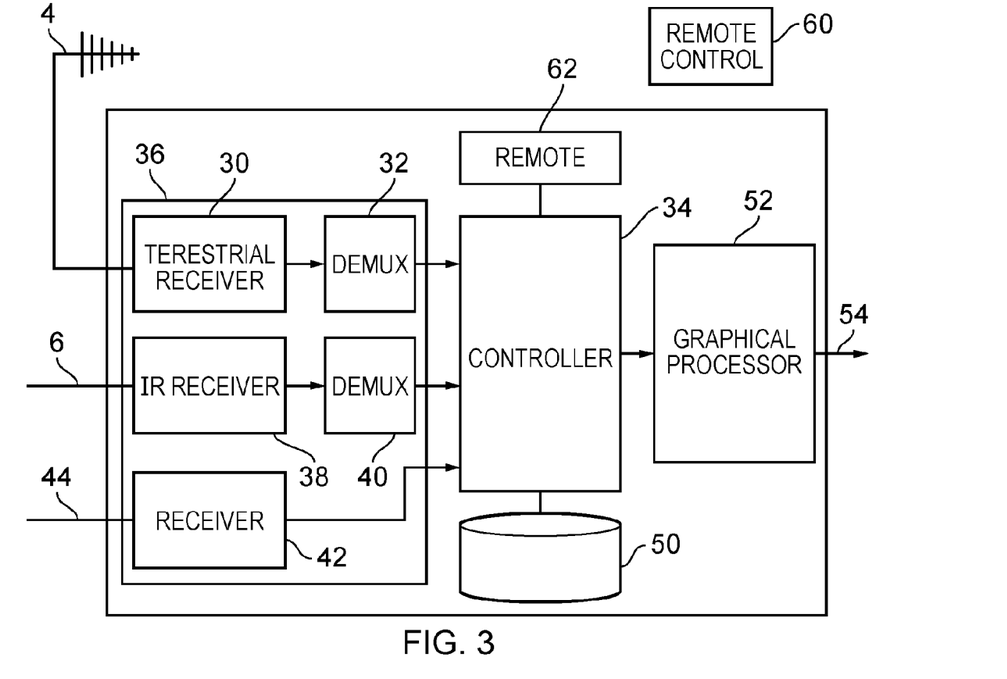
FIG. 3 is a schematic block diagram of one example of a set-top box shown in FIG. 2 according to one example embodiment.

An example embodiment of the present technique is shown in FIG. 3 which is a schematic block diagram of the set top box 3. However, as will be appreciated in other examples the arrangement shown in FIG. 2 could form part of the television 1 or indeed could form part of any other apparatus which is arranged to generate an EPG for selecting television programmes such as a computing device, a tablet computer or a mobile phone. In FIG. 3 the television antenna 4 feeds radio frequency signals to a terrestrial receiver 30 which demodulates and decodes television programmes from television channels which are multiplexed onto a transport stream provided by a radio frequency signal detected by the antenna 4. The television channels are broadcast from a transmitter of the radio frequency signals by a television broadcast service provider using a terrestrial broadcast transmission system.

In one example the television programmes carried by the radio signal are modulated and encoded in accordance with a DVB standard such as DVB-T or DVB-T2. According to the DVB standard, the broadcast television signal comprises a stream of packets of data multiplexed together and modulated onto the radio frequency signal detected by the antenna 4. The stream is sometimes referred to as a channel because it corresponds to a transmissions channel. The stream contains packets of video and audio data and packets of signalling data. Each packet of signalling data is associated with a particular table. The arrangement and contents of the table is in accordance with the DVB standards such as EN300468 and EN302755 (DVB-T2 standard). For the example of DVB-T2, signalling packets communicated as part of the transport of services, providing the television programmes, includes a service description table (SDT) and an event information table (EIT) which provides information relating to a schedule of programmes for transmission on each of a plurality of channels which are conveyed by the DVB-T2 signal. Accordingly, at the output of the terrestrial receiver 30 there is provided a de-multiplexer 32 which de-multiplexes the services from the transport stream which are then fed to a controller 34 which can be used to select one of the television channels and therefore the television programme carried by the transport stream.

Also shown in FIG. 3 forming part of what is generally referred to as a receiver 36 is an IP receiver 38 which receives internet protocol data from the connecting cable 6. The IP receiver generally provides a protocol stack for receiving audio/video data or signalling data from the servers 12 shown in FIG. 2 via the internet and the local area network cable 6. Correspondingly, the example above for the terrestrial receiver, a de-multiplexer 40 is arranged to recover audio/video data representing a television programme which maybe streamed from one of the servers 12 over the internet and fed to the controller 34 for selection and display by the user. However, again the servers 12 can also provide the IP receiver with data representing a schedule of programmes from which an EPG can be generated by the control of 34. Similarly the receiver 36 may also provide further receiver unit 42 which may receive a stream of audio/video data or signalling from a connecting channel 44 from an alternative source such as a cable which then recovers the audio/video data representing a television programme and/or signalling data representing a schedule of television programmes which are fed to the controller 34. In one example the television programmes may be conveyed using a DVB standard such as DVB-C2.

In operation the controller 34 is arranged to select one or more television programmes from one or more of the sources from the receiver 36 for either display on the television 1 or recording in a data store such as a hard disk 50. The controller 34 therefore feeds a programme for display to a graphics processor 52 and generates television signals fed on an output signal 54 to the television 1 for display on the television. A data store 51 is used to store user preferences and associated information for determining predetermined actions as explained below.

A user may control the apparatus shown in FIG. 3 either using a control panel on the apparatus itself or using controls on a remote control 160 which generates signals which are received by a receiver unit 62 which therefore receives user commands which are passed to the controller 34.

Embodiments of the present disclosure provide an arrangement for generating an enhanced EPG using the controller 34 from data representing a schedule of television programmes received from one or more sources such as illustrated by the receiver 36 receiving signalling data and/or the servers 12 via the internet to generate the EPG. An example of an EPG is shown in FIG. 4a.

Figure 4A:
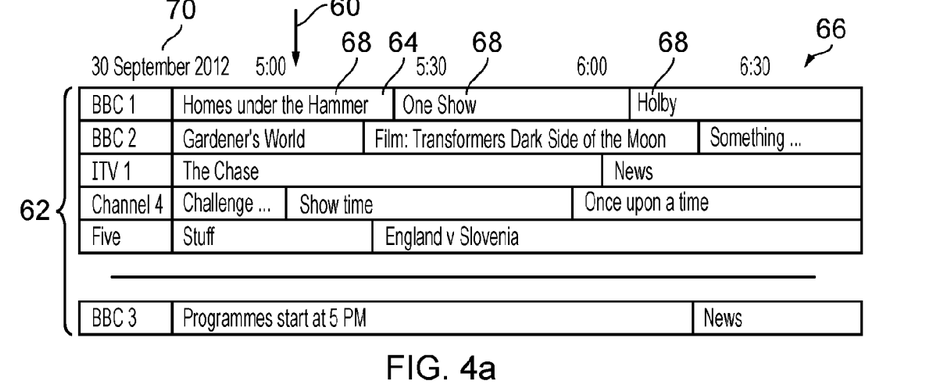
FIG. 4a is a graphical representation of an example of an EPG showing programmes which are to be broadcast.

In FIG. 4a it is assumed that the current date is 30 Sep. 2012. Thus the current time may be approximately 5:10 PM so that the electronic programme guide illustrates programmes which are to be broadcast after a time of 5:10 PM. Thus an arrow 60 represents a current time. For the example shown in FIG. 4a for each of a plurality of segments of time, which in the example shown is in segments of 30 minutes, elements of the EPG represent television programmes which are to be transmitted for each of the half hour slots from 5:00 PM, 5:30 PM, 6:00 PM, 6:30 PM for each of a plurality of channels 62. Thus as shown in FIG. 4a, which corresponds to a conventional arrangement, each of the elements 64 represents a duration of a television programme shown with respect to time 66 with an identifier 68 providing an identification of the particular television programme to be broadcast.

Figure 4B:
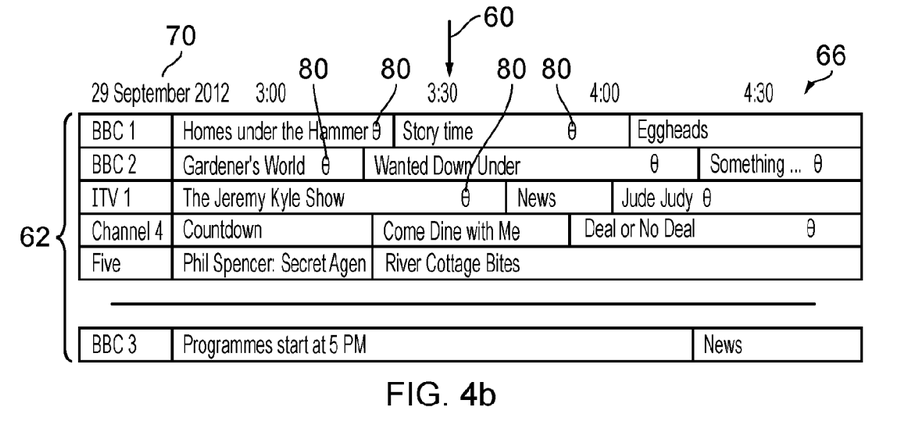
FIG. 4b is an EPG representing programmes which have been broadcast and so represents a reverse time EPG looking at a day which has passed.

FIG. 4b represents a corresponding example to that shown in FIG. 4a except that the television programmes shown in the EPG of FIG. 4b are for the previous day, which is as indicated by a date indicator 70 to be 29 Sep. 2012 and so the programmes represented in the EPG have already been broadcast. However, as shown in FIG. 4b because the programmes have already been broadcast they can no longer be received from a conventional broadcast transmission system such as the transport stream provided by a DVB-T2 transmission. However, as shown some of the programme elements displayed in the EPG with an indicator "θ" 80 which indicates that the particular television programme is available from one or more of the servers shown in FIG. 3 for streaming to the set top box 2 via the internet. Accordingly, by selecting one of the programmes concerned the controller within the set top box 2 is arranged to access a particular URL providing a source for the audio/video data representing the television programme from which the television programme can be streamed and displayed to the user on the television.

Figure 4C:
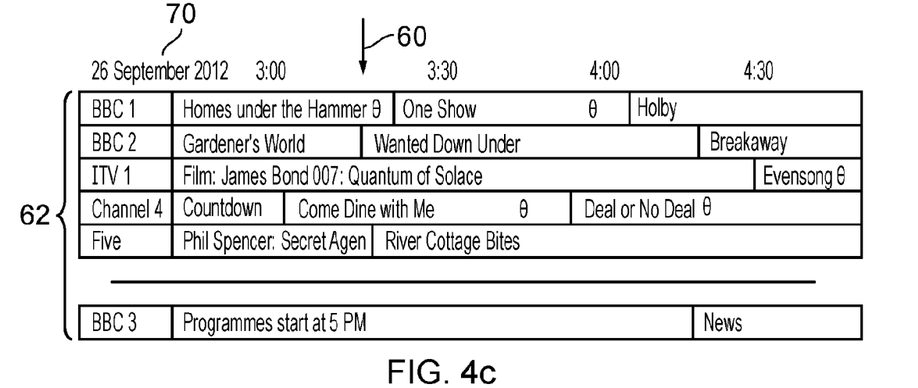
FIG. 4c is an EPG showing programmes which have passed but are further back in the past by a number of days with respect to the present day.

Television programmes, which have been broadcast, can be accessed after the time of broadcast using a streaming service from a server 12 provided by the original broadcaster such as the BBC iPlayer or the Channel 4, 4OD. One aspect of providing a "catch up" service in this way is that the television programmes are only available for streaming from a server 12 provided by the broadcaster for a predetermined time after the original time and date of broadcast. As such although a television programme may initially be available for streaming from a server 12 over the internet, after a predetermined number of days the television programme may no longer be available for streaming over the internet. Such an example is shown in FIG. 4c in which the EPG is shown for a date of 26 Sep. 2012 which is 4 days before the current day of 30 Sep. 2012. Therefore, for some of the examples shown in FIG. 4c such as those on BBC2 for example "Gardeners World" and "Wanted Down Under" are no longer available for streaming and so the identifier 80 is not shown. In other examples the television programme may never have been made available for streaming by the broadcaster for example because of a lack of resources or copyright management issues. For example, in some instances Sports content and Movie content can often have limited broadcast rights, so it may not be available for streaming by the original broadcaster or may only be available from different sources or not available at all.

Availability Status Indication

For the examples shown in FIGS. 4a, 4b, 4c the EPG is provided with an indication that television programmes which have been broadcast may be available for streaming. However, embodiments of the present technique can address a technical problem relating to an aspect of television broadcast services concerning a lack of availability of some broadcast content. Some broadcast content may not be available for streaming because not all broadcast content is allowed to be delivered by an IP/catch-up service after its original transmission. This may be due to the broadcaster not having relevant redistribution rights, or copyright, or not having a catch-up service infrastructure. Furthermore, if a television programme is available for streaming on a catch-up service the content when provided as 'catch-up' may have restrictions such as reduced quality of the image/sound, it may require payment, or be only available for just a narrow 'window of time' to view as mentioned above with reference to FIGS. 4b and 4c.

Embodiments of the present technique provide an arrangement for providing an advanced signal providing an advanced indication that content/event/data/services/groups of service (e.g. Bouquets, Multiplexes and Networks). Accordingly the advanced signal provides an availability status that the television programme:

Will not later be available for Catch-up via a streaming service or from Video on Demand (VOD) consumption.

If the television programme or media content item is available, but only via a pay service which will incur cost to view or consume, this can also be flagged. The indication can also take into account the payment level, or whether personal subscription would already cover these costs.

The advanced signal indication could have granularity to indicate related information, which can assist in determining whether or not the video display apparatus should record the broadcast television programme or access the television programme from an alternative source.

In some example embodiments the advanced signalling representing the status availability can be cached into an event data store from which it can be compared and filtered in accordance with predetermined conditions to determine an action to be performed. The predetermined action could be recording the broadcast television programme or accessing the multimedia item from an alternative source in accordance with for example a user's viewing habits, indicating services, events, genre or a series preference which the user has viewed more than once in the past, either by broadcast or by IP TV services or following their preferred settings. In some examples the controller 34 can be arranged to include predetermined conditions for different users within a household to have their own unique configuration and individual profiles. The availability status of the television programme can be provided from either 'broadcast' signalling, or via an IP derived signal or database or explicit recommendation or any other method or combination of methods. As will be appreciated the availability status can also apply to IP delivered content by using techniques such as IP. Multicast and therefore is not limited to conventional broadcast transmissions such as terrestrial broadcast and can be applied to other sources of content, media or audio/video data.

Figure 5:
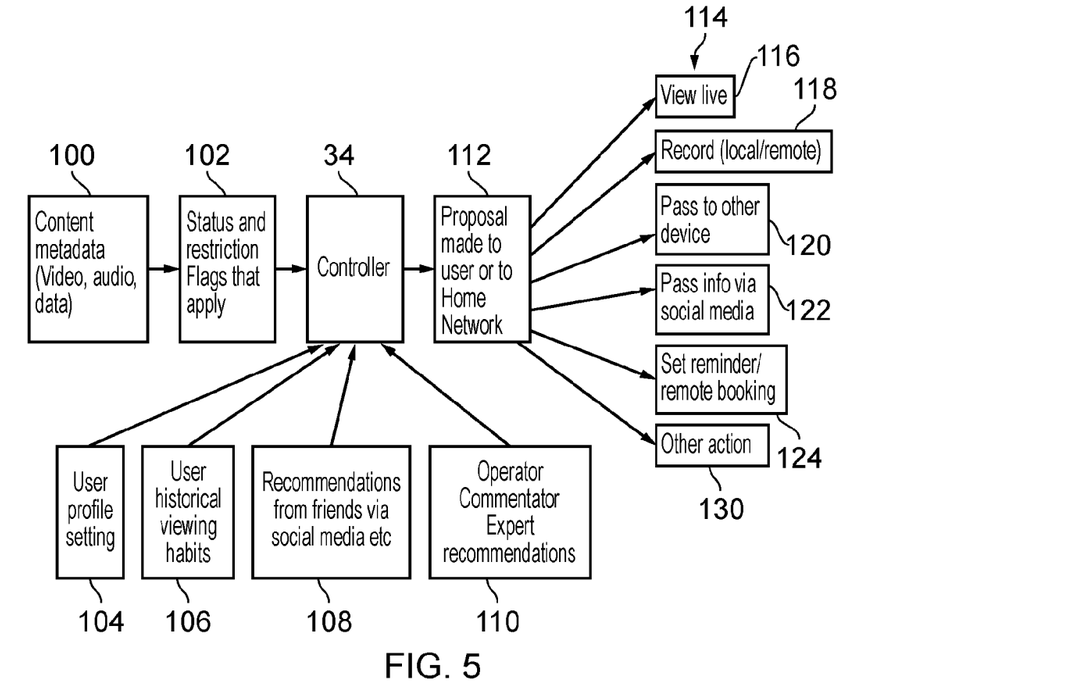
FIG. 5 is a graphical representation of an operation flow of a controller of a set-top box according to the present technique.

FIG. 5 provides a conceptual flow of processing performed by the controller 34 in response to the signals indicating whether or not the television programme will be available for being selectively streamed after it has been broadcast. The signals providing an indication of the availability of the television programme after it has been broadcast may be received from the television programme itself or may be received from an alternative source such as a server via the internet. As shown in FIG. 5 the television programme or content providing video, audio or data may have associated with it meta data. The meta data may include a status of availability of the television programme including a flag which may indicate whether or not it is available for being selectively streamed from an alternative source after it has been broadcast. The content meta data 100 and the status flag 102 are then fed to the controller 34 which also has already received a schedule of broadcast of the television programmes which is used to generate the EPG. The controller also receives a user profile setting 104 which may be a preference indicated by the user for preferred television programmes. The controller may also receive an indication of historical viewing habits which are recorded by the controller in response to programmes selected by the user from the EPG 106. Also provided to the controller 34 are recommendations from friends or social media 108 or operator comment or expert recommendations 110. In response to preprogrammed logic within the controller 34, the controller generates for display on the television a proposal to the user or transmitted onto a home network for access by the user from another source 112. The options 114 generated via the controller 34 include viewing live 116, recording 118, streaming to another device 122, pass information to a social media website 122 or set a reminder using the EPG to prompt the user to watch the television programme 124 or some other action 130.

Figure 6:
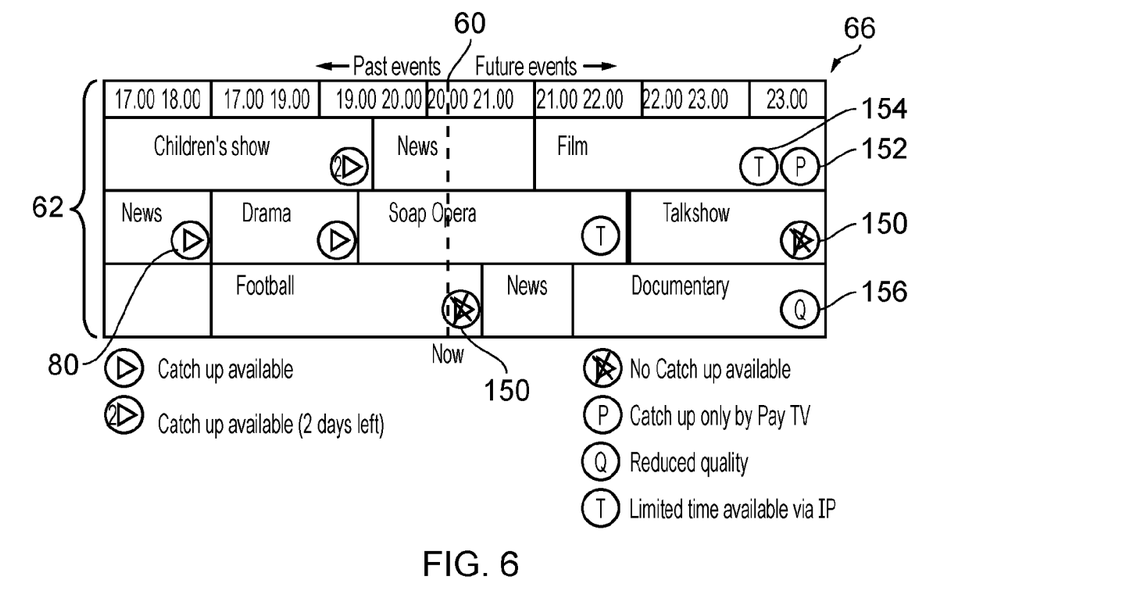
FIG. 6 is a graphical representation of an EPG operating in accordance with the present technique.

A representation of the electronic programme guide generated by the controller 34 of the video processing apparatus shown in FIG. 3 is shown in FIG. 6. In FIG. 6 as for the example shown in FIGS. 4a, 4b and 4c both past and future broadcast events are shown with respect to a time line 60. A banner 66 shows a reference to time and television programmes for each of a plurality of channels are displayed 62. However, also presented on the electronic programme guide is an indication 80 that the television programme is available for streaming after it has been broadcast. In accordance with the present technique the EPG shown in FIG. 6 includes an indication 150 that the television programme will not be available using a catch up service by selectively streaming the television programme from a server.

In accordance with some embodiments, further indications are provided on the EPG, such as whether the television programme can be selectively streamed from a pay website or pay TV 152, whether the television programme will be available in a time limited duration 154 or whether the television programme is only available with a reduced quality 156. A forward looking EPG can highlight an item that will not be available by catch up or has another restriction mentioned above. This can be done for example using colour coding, using a predetermined symbol or icon, position, or can be extracted into a separate EPG list for separate checking by the user. An indication could be provided to the user within the extracted EPG view showing genre personal preferences.

As will be understood from the embodiments described above, using the controller 34 in combination with user preferences stored in the data store 51, the video processing apparatus can access an availability status of the television programme after it has been broadcast so that according to predetermined logical conditions the video processing apparatus can decide to record or cache the television programme locally on a hard disk, or on other storage devices within proximity or usage within a home network. According to the predetermined logical conditions the video processing apparatus could perform predetermined actions, such as:

- To warn the user that there is an event that once transmitted LIVE, may or will not be available later via catch-up/pay/VOD/IP etc. By giving this early indication it is helping the user to make an informed decision as to whether the content should be viewed LIVE, or to take actions to consume at a later date. (This early indication can relate to a number of sources of content such as Television, IP, Multicast, etc and is not restricted by the examples set-out in this document).
- If it is just available later via a PAY service to show that as a warning or caution. The cost level can also be included.
- If it is just available later at a reduced quality (bit rate), or is its available at a later date with an enhanced quality method such as HD, 4K, 3D etc.
- If it is just available later within a catch-up/VOD limited time window.
- If the event is at a time of day when viewing does not usually take place (i.e. at work or school etc).
- The warning or advance information could also be cached and used automatically by a receiver, or home networking hub, or any other device and/or used in conjunction with personal genre configurations or broadcast record list logic.
- Warnings or Advance information could be passed to other devices within a home network or in close proximity by, but not limited to technologies such as Wifi, Bluetooth, DLNA, IP etc.
- This database of information can be passed partially or in its entirety to other devices which are on a related network or close proximity, such as second screen, tablets, mobile phone etc, or it could be passed to friends and family via other methods such as E mail, social media etc.
- The user action to receive information and make decisions may be done across many devices within the eco system i.e.
    - A television may receive the advanced information.
    - IP browser receives the information via the cloud.
    - It creates a data base against each user registered on the set.
    - When those users are in proximity via a second screen (mobile/Tablet), it will inform them of the events coming up, what it thinks they are interested in.
- The user or an automated system could make a decision that may include:
    - To Ignore
    - To Record (defining which device to record on as there may be multiple options including HUB personal home storage etc)
    - Request a reminder (intend to view)
    - Pass the information to a friend (via E mail, social media etc)
    - Add the information into schedule information such as Outlook Calendars etc.

Additional Automated Capture Options

As explained above, in some examples, the controller 34 can be configured to auto record of broadcast television programmes which are indicated to be not available after the television programme has been broadcast. However this may capture high quantities of data and quickly fill any Hard disk drive or other storage media. To limit the recordings, appropriate logic can be applied to selectively record television programmes or content items. For example, the controller 34 can selectively record television programmes or content items depending upon for example a limited number of services/channels, which can be selected by the user in a settings menu or based on previous viewing habits. In other examples, the selective recording of television programmes which are not available after broadcast can include whether on history of previously captured and subsequently viewed television programmes, based on a time of broadcast of the television programme, for example the user wants drama but does not want daytime TV that is classified as drama. For example, the time window will allow the precondition logic to record drama between 17.00 to 02.00, but do not consider Drama between 07.00-17.00. Recording options also could be based on Parental Guidance metadata.

Other examples of selective conditions for recording television programmes indicated as not being available after broadcast include recording items of a predetermined content genre. These may be selected by the user or by using a simple system priority such a High/Med/Low/None setting or 1- to 10 of importance for preferred genres. The system will use these settings in turn to prioritise conflicts in duplicated events. i.e. 'You should watch this . . . and record that . . . '. User receiver settings can also be used to determine the priority of recording or reminders or to determine other actions. For example for the Hard of Hearing or the Visually Impaired users, if the related features of Audio Description or Subtitles are enabled, these factors can be built into the system logic to determine the priority of recordings, reminders or other actions. This would allow users that might require subtitles and/or Audio Description (AD) to prioritise these reminders or recordings.

The table below provides an example of priorities for each individual user for preconditions stored in the data store 51:

| Genre | Mother | Dad | Jonny | Sarah |
| --- | --- | --- | --- | --- |
| Sport | 0 | 10 | 5 | 0 |
| Documentary | 8 | 8 | 2 | 6 |
| Children's | 0 | 0 | 10 | 7 |
| News | 10 | 7 | 0 | 5 |
| Drama | 10 | 7 | 0 | 5 |
| Prepared to Pay - movie | £2 max | £3 | NO | NO |
| Prepared to Pay - drama | £0.5 | NO | NO | NO |

In some examples the above criteria for each individual may be combined together, possibly with different weighting to determine whether or not a television programme may be recorded. For example a drama will be captured even if outside of the time window that was requested, based on a logical combination of the conditions identified above for the genre "drama" for all users. In other examples recording and recommended viewing information can also be set based on receiving recommendations from other sources, websites, friends, experts or reputable sources such as the BBC etc.

These recommendations could be provided via IP, home network sources, a second screen, social media contacts, or by signalling.

An example of a possible advanced signal providing an availability status of a television programme after the television programme has been transmitted is shown in the table below. For this example it is assumed that a field is provided in a signal accompanying or related to the broadcast television programme or data representing the schedule of television programmes for generating the EPG. As indicated below an eight bit field is provided to convey each of the possible options:

may in one example be a flag to indicate if it follows the following modes of operation:

1—Positive or negative signalling not carried (e.g. I don't play by these rules).
2—Positive signalling carried, but don't assume lack of negative signalling means negative status is assumed by absence of positive signalling.
3—Positive and negative signalling carried. Anything without a signal is 'status unknown'. Therefore a receiver will need to take a judgement based on other factors how to use.
4—Positive signalling only, but assume that lack of negative signalling is considered a valid negative.

|     |   |   |   |   |   |   |   |   | Condition indicated |
| --- | - | - | - | - | - | - | - | - | --- |
| Bit | 0 | 0 | 0 | 0 | 0 | 0 | 0 | 0 | Undetermined state |
|     | 1 |   |   |   |   |   |   |   | Catch up is available later |
|     |   | 1 |   |   |   |   |   |   | Pay as you go is available later |
|     |   |   | 1 |   |   |   |   |   | Subscription (by contract) is available later |
|     |   |   |   | 1 |   |   |   |   | The IP catch-up event after this one is of significant lower quality |
|     |   |   |   |   | 1 |   |   |   | DLNA/DTCP rights restrictions will apply to IP version content |
|     |   |   |   |   |   | 1 |   |   | A-D for sign impaired is not included on the catch-up version |
|     |   |   |   |   |   |   | 1 |   | In Vision signing for hard of hearing is not included on the catch-up version |
|     |   |   |   |   |   |   |   | 1 | This content is not expected on catch-up or to be repeated within 6 months |

Notes
The table above is only intended as an example and other configurations or conditions can be included
XML schema can also be used to define these states/conditions
Bit masking and bit complementary techniques can also be used.

Further examples of an advanced signal indication could have granularity such as:

A status of an availability of download/multicast (e.g. broadcast push VOD/Catch-up/IP/Pay TV) of a television programme or broadcast content.
Duration of the availability of the alternative media.
An expected time when media will become re-available and at which cost or free.
A status of availability of a television programme or media item with additional accessibility services (e.g. Audio Description, IN Vision signing, Subtitles (video burnt or by text or DVB).
If the television programme or media item which can be obtained from an alternative source is available with or without advertising and the related cost.
An indication of an available media item with alternative language support.
A duration of availability of the Catch-up duration that will be permitted or any limitations (i.e. 1/7/30 days/always).
DLNA/DTCP/CEC/sharing or copying restrictions.
   IP File type (format/bitrate/quality/etc) to allow a user decision to either view or record a higher quality original source transmitted content, then the IP/VOD version.
   Rights restrictions information.
   etc.

Further Additional Signalling (to Aid Deployment)

In order to be sure that signalling from a broadcaster, or network operator or internet protocol service provider can be trusted then the content source can also declare the accuracy of its data. Accordingly a receiver can use the indication to verify a risk to use the information or not. Accordingly the receiver in the video processing apparatus could determine that a lack of signalling should not be taken as an automatic confirmation of validating that data, so additional signalling logic can be applied which may help the broadcaster, operator or data provider deploy such indications. Each network, bouquet, multiplex or service can carry a reliability signal which As will be understood from the embodiments described above, the predetermined action performed by the controller 34 in response to the availability status of the television programme, may be one of a plurality of possible predetermined actions which could be taken, such as record the television programme or prompt the user to watch the television programme. The controller may be configured to determine the predetermined action in response to the availability status by logically combining the availability status of the television programme with a user preference or preferences or preferences from a plurality of users indicating a preferred one of the possible predetermined actions for each of a plurality of states of availability of the television programme after the television programme has been broadcast represented availability status.

In some embodiments the controller 34 may be configured to generate data representative of the user preferences and to store the data representing the user preferences in a data store, for user in determining which of the predetermined actions to take. In one example the controller is configured to generate the data representative of the user preferences by detecting meta data associated with television programmes which are selected for viewing by the user, and comparing the meta data with predetermined categories of meta data representative of a predetermined categories of television programmes. The categories may include a genre of the television programmes or a free to air or pay per view preference or weighting thereof which may be logically combined to select the predetermined action. The availability status may include one of an indication that the television programme will not be available for streaming from a server after the television programme has been broadcast, an indication that the television programme will be only available on a pay per view streaming service, or an indication that a quality of a representation of the television programme which may be available to be streamed from a server is less than the quality available from a broadcast version of the television programme.

Although the above has been described with respect to a television, the disclosure is not limited to such. The disclosure could be implemented in or using a smartphone, laptop, tablet or any other suitable display device.

Various further aspects and features of the present disclosure are defined in the appended claims. Various modifications may be made to the embodiments described above without departing from the scope of the present disclosure. For example although the term television has been used, it should not be interpreted as a only encompassing a conventional fixed receiving apparatus, but could be a mobile device, such as a mobile telephone, tablet computer or other video display receiver. As such although examples of broadcasting audio/video data have included for example DVB, other broadcasting techniques could be used such as ATSC 2.0 or 3.0 or MBMS in which data is broadcast via a cellular communications network or WiFi network. As will be appreciated, although the embodiments have been described with respect to an EPG for past television programmes which have been broadcast, the abovementioned aspects and features could also be applied to television programmes which have not yet been broadcast, so looking to future EPG presentations. Hence embodiments of the present disclosure relate to an enhanced EPG in which alternative options are available for television programmes which have not yet been broadcast.

It will be appreciated that the above description for clarity has described embodiments with reference to different functional units and/or processors. However, it will be apparent that any suitable distribution of functionality between different functional units or processors may be used without detracting from the embodiments.

Example embodiments described above may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosure may be implemented in a single unit or may be physically and functionally distributed between different units and processors. Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the disclosure.

The following numbered clauses provide examples embodying the present technique:

1. An apparatus for selecting television programmes for display on a display device, the apparatus comprising a receiver for receiving audio/video data representing the television programmes and for receiving data indicating a schedule for transmission of the television programmes, the schedule of television programmes including television programmes which are to be broadcast by one or more broadcast transmission systems for each of a plurality of television channels with respect to a transmission time, and television programmes which have been transmitted by the one or more broadcast transmission systems, and for one or more of the television programmes which have been transmitted an indication that the television programme can be received by selectively streaming audio/video data representing the television programme from one or more servers, a control processor configured to receive the data indicating the schedule of television programmes and to generate signals representing the schedule of television programmes for display on the display device which are selectable by a user for display on the display device or recording, wherein the control processor is configured to receive an indication for at least one of the television programmes which are to be broadcast providing a status of an availability for streaming the television programme after the television programme has been broadcast, and in response to the indication of the status of the availability for streaming the television programme to perform a predetermined action in accordance with predetermined conditions.

2. An apparatus according to clause 1, wherein the predetermined action includes recording the television programme on a recording medium.

3. An apparatus according to clause 1, wherein the predetermined action includes generating an indication on the electronic programme guide informing the user of the availability status of the television programme.

4. An apparatus according to any of clauses 1, 2 or 3, wherein the predetermined action performed by the controller in response to the availability status is one of a plurality of possible predetermined actions which could be taken, and the controller is configured to determine the predetermined action in response to the availability status by logically combining the availability status of the television programme with user preferences indicating a preferred one of the possible predetermined actions for each of a plurality of states of availability of the television programme after the television programme has been broadcast as represented by the availability status.

5. An apparatus according to clause 4, wherein the controller is configured to generate data representative of the user preferences and to store the data representing the user preferences in a data store.

6. An apparatus according to clause 4 or 5, wherein the controller is configured to generate the data representative of the user preferences by detecting meta data associated with television programmes which are selected for viewing by the user, comparing the meta data with predetermined categories of meta data representative of a categories of television programmes and from the comparison, maintaining a history of categories of television programmes viewed by the user.

7. An apparatus according to clause 6, wherein the categories include a genre of the television programmes or a free to air or pay per view preference.

8. An apparatus according to any preceding clause, wherein the availability status includes one of an indication that the television programme will not be available for streaming from a server after the television programme has been broadcast, an indication that the television programme will be only available on a pay per view streaming service, or an indication that a quality of a representation of the television programme which may be available to be streamed from a server is less than the quality available from the version of the television programme transmitted by the broadcast service.

9. An apparatus according to any preceding clause, wherein the audio/video data representing the television programmes includes a reliability signal indicating a relative reliability of the availability signal.

10. An apparatus according to clause 1, wherein the one or more broadcast transmission systems including terrestrial, cable or satellite digital broadcast transmission systems and an internet based transmission system.

11. A display device including an apparatus for selecting television programmes for display on the display device, the apparatus comprising a receiver for receiving audio/video data representing the television programmes and for receiving data indicating a schedule for transmission of the television programmes, the schedule of television programmes including television programmes which are to be broadcast by one or more broadcast transmission systems for each of a plurality of television channels with respect to a transmission time, and television programmes which have been transmitted by the one or more broadcast transmission systems, and for one or more of the television programmes which have been transmitted an indication that the television programme can be received by selectively streaming audio/video data representing the television programme from one or more servers, a control processor configured to receive the data indicating the schedule of television programmes and to generate signals representing the schedule of television programmes for display on the display device which are selectable by a user for display on the display device or recording, wherein the control processor is configured to receive an indication for at least one of the television programmes which are to be broadcast providing a status of an availability for streaming the television programme after the television programme has been broadcast, and in response to the indication of the status of the availability for streaming the television programme to perform a predetermined action in accordance with predetermined conditions.

12. A graphical user interface for use with a display device for selecting television programmes for display on the display device, the graphical user interface, when displayed on the display device, comprising a two dimensional array of elements representing a schedule of television programmes with respect of time, the schedule for the television programmes including television programmes which are to be broadcast by one or more broadcast transmission systems for each of a plurality of television channels with respect to a transmission time, and television programmes which have been transmitted by the one or more broadcast transmission systems, wherein the graphical user interface provides an indication for at least one of the television programmes which are to be broadcast of a status of an availability for streaming the television programme after the television programme has been transmitted.

13. A remote display device including an apparatus for generating an electronic programme guide on the remote display device, the remote display device comprising a receiver for receiving audio/video data representing the television programmes and for receiving data indicating a schedule for transmission of the media items, the schedule of media items including media items which are to be broadcast by one or more broadcast transmission systems for each of a plurality of television channels with respect to a transmission time, and media items which have been transmitted by the one or more broadcast transmission systems, and for one or more of the media items which have been transmitted an indication that the media item can be received by selectively streaming audio/video data representing the media item from one or more servers, a control processor configured to receive the data indicating the schedule of media items and to generate signals representing the schedule of media items for display on the television which are selectable by a user for display on the television or recording, wherein the control processor is configured to receive an indication for at least one of the media items which are to be broadcast providing a status of an availability for streaming the media item after the television programme has been transmitted, and in response to the indication of the status of the availability for streaming the media item to perform a predetermined action in accordance with predetermined conditions.

14. A transmitter configured to transmit signals representing audio/video data of television programmes and data indicating a schedule for transmission of the television programmes, the schedule of television programmes including television programmes which are to be broadcast for each of a plurality of television channels with respect to a transmission time, and television programmes which have been transmitted, to transmit data indicating that, for one or more of the television programmes which have been transmitted, the television programme can be received by selectively streaming audio/video data representing the television programme from one or more servers, and to transmit an availability status for at least one of the television programmes which are to be broadcast providing an indication of an availability of the television programme for streaming the television programme after the television programme has been broadcast.

15. A method of selecting television programmes for display on the television, the method comprising receiving audio/video data representing the television programmes, receiving data indicating a schedule for transmission of the television programmes, the schedule of television programmes including television programmes which are to be broadcast by one or more broadcast transmission systems for each of a plurality of television channels with respect to a transmission time, and television programmes which have been transmitted by the one or more broadcast transmission systems, and for one or more of the television programmes which have been transmitted an indication that the television programme can be received by selectively streaming audio/video data representing the television programme from one or more servers, generating signals representing the schedule of television programmes for display on the television which are selectable by a user for display on the television or recording, wherein the generating the signals includes receiving an indication for at least one of the television programmes which are to be broadcast providing a status of an availability for streaming the television programme after the television programme has been broadcast, and performing a predetermined action, in response to the indication of the status of the availability for streaming the television programme, in accordance with predetermined conditions.

16. A method of transmitting a signal representing one or more television programmes, the method comprising transmitting signals representing audio/video data of television programmes and data indicating a schedule for transmission of the television programmes, the schedule of television programmes including television programmes which are to be broadcast for each of a plurality of television channels with respect to a transmission time, and television programmes which have been transmitted, transmitting data indicating that, for one or more of the television programmes which have been transmitted, the television programme can be received by selectively streaming audio/video data representing the television programme from one or more servers, and transmitting an availability status for at least one of the television programmes which are to be broadcast providing an indication of an availability of the television programme for streaming the television programme after the television programme has been broadcast.

The invention claimed is:

1. An apparatus comprising:
receiver circuitry configured to receive data indicating a schedule for transmission of television programs, the schedule of television programs including identification of television programs which are to be broadcast after a present time by one or more broadcast transmission systems for each of a plurality of television channels, and identification of television programs which have been transmitted by the one or more broadcast transmission systems, and for one or more of the television programs which have been transmitted an indication that the one or more television programs can be received by selectively streaming audio/video data representing the one or more television programs from one or more servers; and control processor circuitry configured to control display on a display device of the schedule of television programs which are selectable by a user for display on the display device or for recording, wherein the control processor circuitry is configured to
receive an indication for at least one television program of the television programs which are to be broadcast after the present time, the indication providing an availability status regarding availability of streaming the at least one television program after a scheduled broadcast end time of the at least one television program; and
automatically record on a recording medium the at least one television program in response to the indication indicating that the at least one television program is unavailable for streaming after the scheduled broadcast end time of the at least one television program.

2. The apparatus as claimed in claim 1, wherein the control processor circuitry is configured to
generate an indication on an electronic program guide informing the user of the availability status of the at least one television program.

3. The apparatus as claimed in claim 1, wherein the control processor circuitry is configured to
identify a predetermined action to be performed in response to the availability status by logically combining the availability status of the at least one television program with user preferences indicating a preferred one of possible predetermined actions for each of a plurality of states of the availability status of the at least one television program.

4. The apparatus as claimed in claim 3, wherein the control processor circuitry is configured to generate data representative of the user preferences and to store the data representing the user preferences in a data store.

5. The apparatus as claimed in claim 3, wherein the control processor circuitry is configured to
generate the data representative of the user preferences by detecting meta data associated with television programs which are selected for viewing by the user and comparing the meta data with predetermined categories of meta data representative of categories of television programs; and from the comparison, maintain a history of categories of television programs viewed by the user.

6. The apparatus as claimed in claim 5, wherein the categories include a genre of the television programs or a free to air or pay per view preference.

7. The apparatus as claimed in claim 1, wherein the availability status indicates that the at least one television program will not be available for streaming from a server after the scheduled end time of the at least one television program, that the at least one television program will be only available on a pay per view streaming service, or that representation quality of the at least one television program to be streamed is less than representation quality of the television program to be broadcast after the present time.

8. The apparatus as claimed in claim 1, wherein the receiver circuitry is configured to receive a reliability signal indicating a relative reliability of an availability signal that indicates the availability status.

9. The apparatus as claimed in claim 1, wherein the one or more broadcast transmission systems including terrestrial, cable or satellite digital broadcast transmission systems and an internet based transmission system.

10. An apparatus comprising:
circuitry configured to
cause a display device to display a graphical user interface, the graphical user interface, when displayed on the display device, comprising:
a two dimensional array of elements representing a schedule of television programs with respect of time, the schedule for the television programs including identification of television programs which are to be broadcast after a present time by one or more broadcast transmission systems for each of a plurality of television channels, and identification of television programs which have been transmitted by the one or more broadcast transmission systems; and
an indication for at least one television program of the television programs which are to be broadcast after the present time, the indication providing an availability status regarding availability of streaming the at least one television program after a scheduled broadcast end time of the at least one television program; and
automatically record on a recording medium the at least one television program in response to the indication indicating that the at least one television program is unavailable for streaming after the scheduled broadcast end time of the at least one television program.

11. A method comprising:
receiving data indicating a schedule for transmission of television programs, the schedule of television programs including identification of television programs which are to be broadcast after a present time by one or more broadcast transmission systems for each of a plurality of television channels, and identification of television programs which have been transmitted by the one or more broadcast transmission systems, and for one or more of the television programs which have been transmitted an indication that the one or more television programs can be received by selectively streaming audio/video data representing the one or more television programs from one or more servers;

controlling display on a television of the schedule of television programs which are selectable by a user for display on the television or for recording;

receiving an indication for at least one television program of the television programs which are to be broadcast after the present time, the indication providing an availability status regarding availability of streaming the at least one television program after a scheduled broadcast end time of the at least one television program; and automatically recording on a recording medium the at least one television program in response to the indication indicating that the at least one television program is unavailable for streaming after the scheduled broadcast end time of the at least one television program.

* * * * *